United States Patent [19]

Blahut et al.

[11] Patent Number: 5,442,389
[45] Date of Patent: Aug. 15, 1995

[54] PROGRAM SERVER FOR INTERACTIVE TELEVISION SYSTEM

[75] Inventors: Donald E. Blahut, Holmdel; Edward S. Szurkowski, Maplewood, both of N.J.

[73] Assignee: AT&T Corp., Murray Hill, N.J.

[21] Appl. No.: 997,985

[22] Filed: Dec. 28, 1992

[51] Int. Cl.⁶ .......................................... H04N 7/173
[52] U.S. Cl. ......................................... 348/7; 348/13; 455/4.2
[58] Field of Search ............... 358/86; 455/4.2, 5.1, 455/6.1; 370/85.1, 85.3, 73, 71, 124, 110.1, 94.1, 94.2; H04N 7/16, 7/173; 348/7, 12, 13

[56] References Cited

U.S. PATENT DOCUMENTS

| | | | |
|---|---|---|---|
| 3,746,780 | 7/1973 | Stetten et al. | 178/6.6 A |
| 4,439,784 | 3/1984 | Furukawa et al. | 358/86 |
| 4,461,032 | 7/1984 | Skerlos | 455/4 |
| 4,499,568 | 2/1985 | Gremillet | 369/30 |
| 4,633,462 | 12/1986 | Stifle | 455/5.1 |
| 4,689,619 | 8/1987 | O'Brien, Jr. | 358/86 |
| 4,763,191 | 8/1988 | Gordon et al. | 358/86 |
| 4,780,757 | 10/1988 | Bryer et al. | 358/86 |
| 4,890,321 | 12/1989 | Seth-Smith | 455/4.2 |
| 4,897,867 | 1/1990 | Foster et al. | 358/86 |
| 4,905,094 | 2/1990 | Pocock et al. | 358/342 |
| 4,920,533 | 4/1990 | Dufresne et al. | 455/5.1 |
| 5,130,792 | 7/1992 | Tindell et al. | 358/85 |
| 5,132,992 | 7/1992 | Yurt et al. | 375/122 |
| 5,142,532 | 8/1992 | Adams | 455/5.1 |
| 5,172,413 | 12/1992 | Bradley et al. | 455/6.1 |
| 5,193,208 | 3/1993 | Yokota et al. | 455/4.2 |
| 5,251,909 | 10/1993 | Reed et al. | 358/86 |
| 5,341,474 | 8/1994 | Gelman et al. | 348/7 |
| 5,357,276 | 10/1994 | Banker et al. | 348/7 |

OTHER PUBLICATIONS

"System Architecture for a Large Scale Video on Demand Service", by W. D. Sincoskie, Computer Networks and ISDN Systems 22 (1991), pp. 155–162, North-Holland.

Primary Examiner—James J. Groody
Assistant Examiner—Chris Grant
Attorney, Agent, or Firm—Geoffrey D. Green; David M. Rosenblatt

[57] ABSTRACT

The invention relates to a system for transmitting stored programs, such as movies and musical works, to customers via a distribution network, such as a cable television system. The programs are stored in compressed form in a program library, such as a tape cartridge library. On receipt of a request for a program, a request processor sends control messages causing a data block comprising the requested program to be read from the program library at high speed and stored in a large dynamic random access memory (DRAM) in a server. The server then sends the program from DRAM over the distribution system to a customer as a series of digital packets. Each instance of sending a program is managed by a separate command word. The customer can request such operations as "fast forward" by sending control messages that change pointers in the command word. Command words can be grouped to send multiple audio and/or video overlays simultaneously and linked to send program sequences. The request processor, server, program library and interfaces to distribution networks can be at different locations.

41 Claims, 8 Drawing Sheets

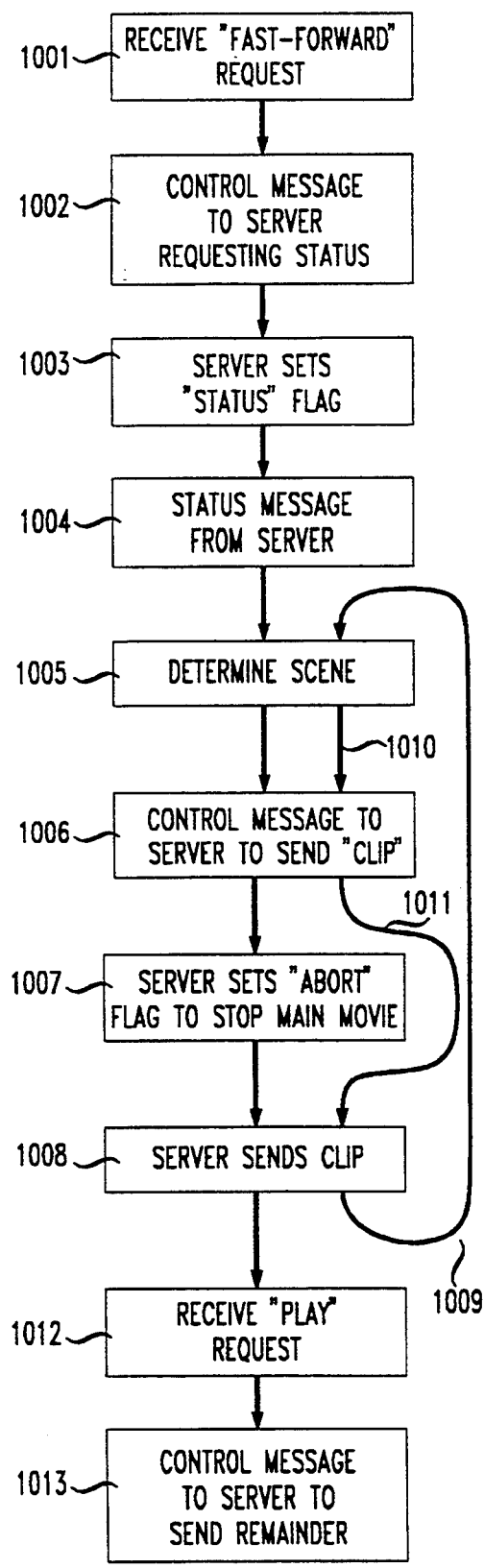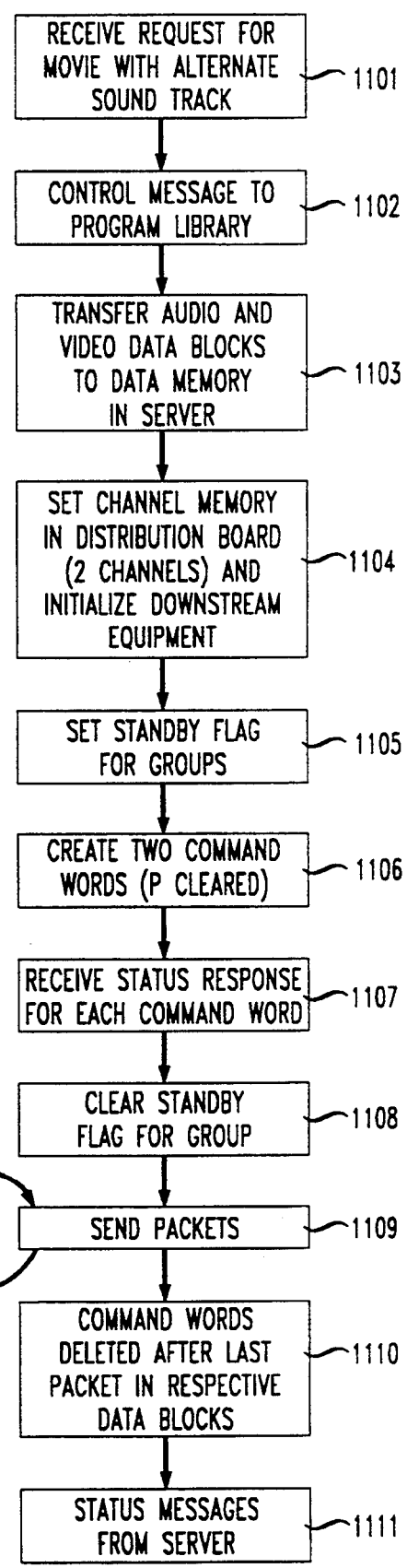

PROGRAM SERVER FOR INTERACTIVE TELEVISION SYSTEM

TECHNICAL FIELD

This invention relates to systems for retrieving and presenting program material, such as movies and musical selections, to users of a program distribution system, such as a cable television system, and more specifically to a server for simultaneously retrieving and presenting multiple programs in compressed and packetized form over multiple channels.

BACKGROUND OF THE INVENTION

Cable television systems are now in operation that provide for selective viewing of specific programs by their customers. For example, some present systems provide their customers the ability to view requested movies by transmitting such movies to such customers over dedicated channels and permitting the customers to control the showing of such movies in a manner similar to the control of a conventional video disc or cassette player. However, at present such systems typically require manual or automatic loading of a video disc or tape cartridge containing the desired movie in a player at a centralized location. The customer operates the player remotely. However, such a system becomes impractical for large numbers of customers because of the large number of players needed, the large numbers of tape cartridges and/or discs (including duplicates) necessary to satisfy customer requests and the physical problems associated with transporting the right cartridge or disc to a given player when needed.

Other interactive cable television services have been proposed in which specific programs are created from various video and/or audio segments combined sequentially or simultaneously. Such segments must be stored and made retrievable in such a way that the system creating such programs can control the sending of such segments in the appropriate combinations at the appropriate times.

What is needed is a facility for storing large numbers of data blocks of various sizes that can be retrieved and sent to customers as necessary to provide the proposed interactive services.

SUMMARY OF THE INVENTION

Data blocks are stored in a large library, such as an automated tape cartridge library, for subsequent retrieval. Such data blocks are retrieved from the library and written into a data memory in a server and then forwarded by the server over multiple channels. The same data blocks can be sent repeatedly from the data memory in different channels during overlapping time periods. Groups of one or more data blocks can be sent together.

The invention is described in terms of an interactive television system. The data blocks are program segments, such as movies, musical selections, audio clips or video clips, which are stored in compressed and packetized form in the library. Data blocks for programs to be presented are retrieved from the library and stored in a server in a large-capacity random access memory (RAM), with the data for each packet stored as a single word. Such library can be located away from the server and the programs transmitted to the server over a data link or network. Requests for programs are processed by a request processor, which can be located away from the library and the server, and which communicates with the library and the server via a data link or network.

Each instance of sending a data block is represented by a command word in a command-word memory in the server. The controller also contains a microprocessor, a specialized pipeline processor for command words, a token memory, a multiplexer and various registers and first-in-first-out buffers (FIFOs). In addition to one or more command words corresponding to one or more data blocks in the current group, the command-word memory can also contain command words for data blocks in subsequent groups in readiness for transitions between groups. The microprocessor loads command words into a command-word FIFO and control messages into a control-message FIFO.

Each command word includes various fields and control flags pertaining to its associated data block, the identity of the group to which it belongs and the identity of the subsequent group. The command words are repeatedly read from the command-word memory, processed in the pipeline processor and read back into the command-word memory. When a packet is to be sent, the pipeline processor writes a packet request containing the packet address and the virtual-channel identity into a packet-request FIFO and updates the command word accordingly.

The token memory contains control flags pertaining to each group. Such control flags interact with flags in the command words when the command words are processed by the pipeline processor and suppress the sending of data blocks in subsequent groups until sending of all data blocks in the current group is completed. The token memory can also be written by the microprocessor so that the microprocessor can indirectly control the sending of data blocks for a given group.

The multiplexer reads packet requests from the packet-request FIFO, uses the packet address to read the packet data from data memory onto a data bus and places the channel identity for the packet on a channel-identity bus. If there are no packet requests, the multiplexer reads control messages from the control-message FIFO and places the data for each message on the data bus and the channel identity on the channel-identity bus.

The data memory is divided into sections. While an address is being read in one section, addresses in any of the other sections can be written during the same memory cycle.

Distribution boards connect the data bus and the channel-identity bus to distribution links. Such distribution links further connect the server to distribution means, such as the headends of cable television systems and the like. Each distribution board includes a RAM containing the identity of the channels to be sent over its distribution link, a FIFO containing packets to be sent and a communications interface for convening the packets to the appropriate signals for transmission over the distribution link.

These and other aspects of the invention will become apparent from the drawings and detailed description.

BRIEF DESCRIPTION OF THE DRAWING

FIGS. 8, 9, 10 and 11 are flow charts of examples of use of the invention.

DETAILED DESCRIPTION

The invention will be described in terms of a program server for an interactive television system. Programs can be material such as movies, musical selections or interactive television presentations that can involve selection and presentation of single or multiple program elements to a user. The server is responsive to requests from users. Such requests may simply be requests for presentation of a particular program element or group of elements; however, in interactive applications, requests may involve responses from a user to other elements. In general, the server of the invention sends data blocks over multiple channels in the form of digital packets sent at intervals appropriate to the data rate needed for the particular program elements. It will be clear to those skilled in the art that the methods and apparatus of the invention can be used in connection with any kind of data and not just dam for the program elements described herein.

Figure 1:
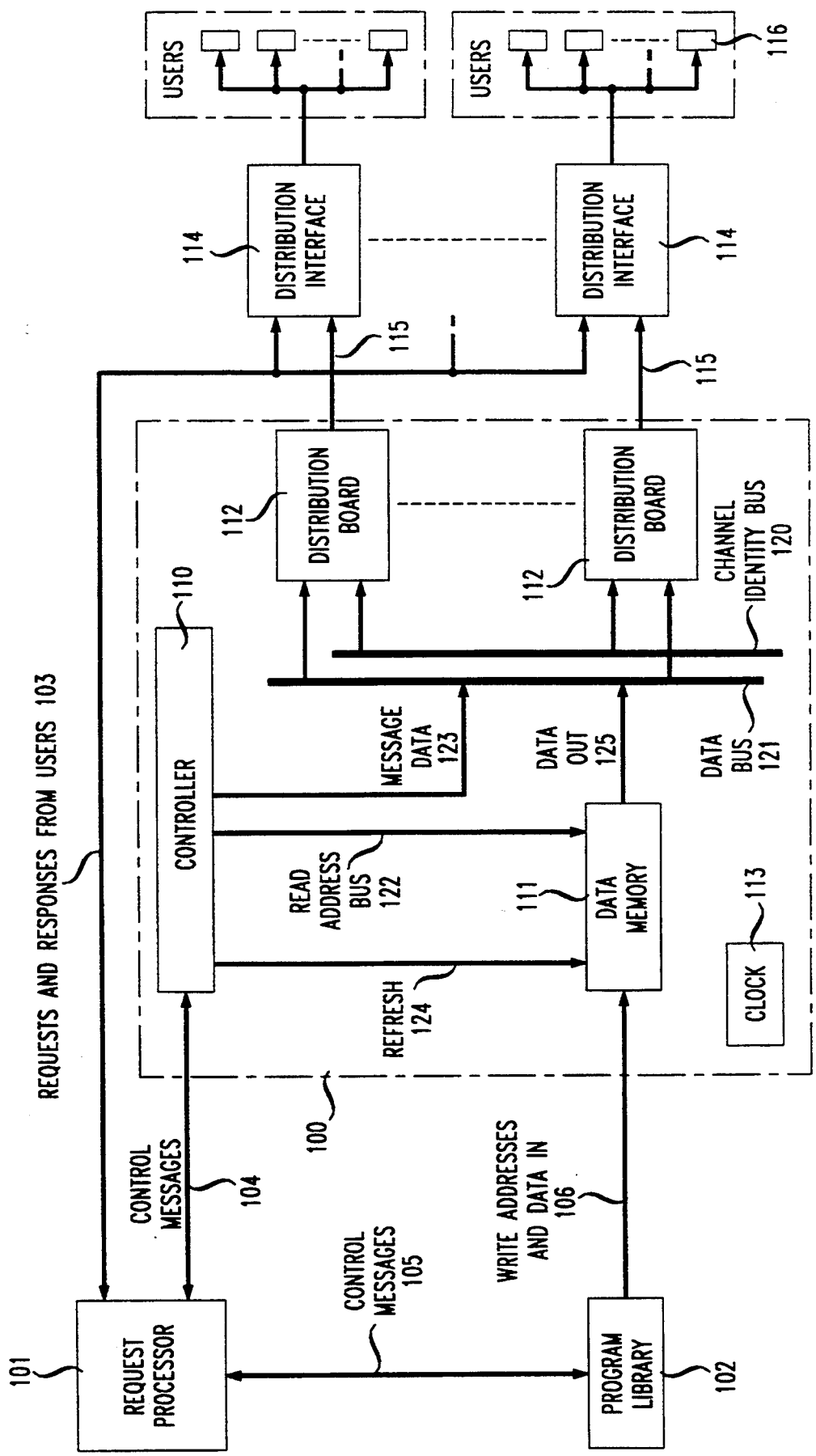
FIG. 1 is an overall block diagram of a program server and its associated request processor and program library in accordance with the invention.

FIG. 1 is an overall block diagram of a program server 100 and its associated request processor 101 and program library 102 in accordance with the invention. Server 100 contains controller 110, data memory 111, distribution boards 112 and clock 113. Request processor 101 receives requests (and responses in interactive systems) via data link 103, issues control messages to controller 110 in server 100 over data link 104 and issues control messages to program library 102 over data link 105. It may also be desirable for request processor 101 to be able to receive messages, such as status messages, from controller 110 and program library 102, so data links 104 and 105 are shown to be bidirectional. Program library 102 sends data for programs to be presented to data memory 111 in server 100 over data link 106. Server 100 sends programs to distribution interfaces 114 over distribution links 115. Distribution interfaces 114 then forward programs to users 116.

Data links 103, 104, 105 and 106 can be implemented either as dedicated dam links or networks, depending on the application. Server 100, request processor 101 and program library 102 can be at the same or different geographic locations, again depending on the application. An example of a typical configuration of the elements shown in FIG. 1 is an interactive cable television system in which server 100 and request processor 101 are located on the premises of a supplier of interactive television services, program library 102 is at another location and serves many such suppliers and distribution interfaces 114 are cable system headends located on the premises of cable television companies. Similar systems can be configured in which programs are distributed to customers over telephone networks and distribution interfaces 114 are appropriate interfaces in such networks, or in which programs are distributed via microwave distribution systems.

Request and response messages can be received by request processor 101 in a number of different ways. For example, for cable systems equipped to receive uplink messages from customers, such uplink messages can be used for requests and responses and forwarded directly from the cable headend to the request processor over an appropriate data link or network, such as data link 103. For cable systems not having such capability and for telephone distribution systems, such requests can be sent to request processor 101 via the telephone network.

As can be seen from the above description, there are numerous possible configurations for server 100, request processor 101 and program library 102 and distribution interfaces 114 and there can be any number of servers 100, request processors 101, program libraries 102 and distribution interfaces 114, all of which can be used together in accordance with the principles of the invention.

Request processor 101 can be any general-purpose computer, such as a Sun "SPARKSTATION" computer, capable of receiving and transmitting messages over data links 103, 104 and 105, of processing requests and responses received, of sending the appropriate control messages to server 100 and program library 102 and of receiving messages from server 100 and program library 102, if required. Such processing may involve simply responding to requests for programs, such as movies, by sending the appropriate control messages to a program library 102 where the movie is stored to transmit a data block for the movie to data memory 111 in a server 100 and to the server 100 to transmit the movie in a specified channel over a distribution link 115. Alternatively, such processing may involve the actual assembly of a program from video and/or audio clips stored in program library 102, and such assembled program may be interactive in that the clips to be sent in a later part of a program may be determined by responses from users received over data link 103. Furthermore, such assembled program may contain multiple video or audio clips to be transmitted to the user at the same time. For example, a video sequence may comprise a background and one or more overlays, each of which is to be transmitted as a separate signal by server 100 over a distribution link 115. Such separate signals are combined into a single video signal for presentation to the user at some point between server 100 and the user, such as at the headend of a cable television system or the cable converter used at the user's premises to connect the user's television receiver to the cable system.

Program library 102 can be a large capacity system of any convenient type using devices such as magnetic discs, optical discs or magnetic tape. One example of such a system is the Ampex DST ™ 800 Series Automated Cartridge Library available from Ampex Corporation, Redwood City, Calif. Such a system has a data capacity of 6.4 terabytes on 256 25-gigabyte cartridges. The video and stereo audio portions of a movie can be packetized and compressed, by means well known in the art, so that the data rate for transmission is, for example, 1.5 megabits/second. A two-hour movie then requires 10.8 gigabits, or 1.35 gigabytes, of storage. Each such cartridge will hold 18+ such movies. Thus, such a cartridge library has a capacity of approximately 4,600 two-hour movies, or an equivalent amount of separate audio and video clips. Of course, such a library could easily be arranged to store an assortment of complete movies and audio selections and separate audio and video clips.

One of the developments that has made the invention feasible is the availability of large RAMs for use in data memory 111 in server 100. In an exemplary embodiment, such memory contains $2^{32}$ words × 48 bytes per word (approximately 206 gigabytes) to store over 150 full-length movies. The four tape drives in the cartridge library described above can each read and transmit data at a sustained rate of 15 megabytes per second. Thus, four two-hour movies can be written into data memory 111 in 1½ minutes. As will be described, a single movie stored in data memory 111 can be transmitted to multiple users, each on a different channel, with each user having control of the timing of his or her own presentation. Thus, assuming that some movies will be watched by more than one user, even at different times, the exemplary embodiment of server 100 has the capacity to serve far more than 150 customers simultaneously. As will be described, the exemplary embodiment of server 100 has the capacity to serve up to 1600 customers simultaneously at 1.5 megabits/second per customer.

Responsive to control messages from request processor 101, program library 102 transmits data blocks representing compressed program data to data memory 111 in the form of digital packets, each containing a 32-bit write address and 48 bytes of data in the exemplary embodiment. In order to handle the data rate of 15 megabytes per second, the data link or network between program library 102 and 106 can be a system such as the 155 megabit/second SONET OC-3 system. As will be described, data memory 111 buffers such data in FIFOs and writes such data as 48-byte words into the addressed portion of data memory 111 only when such portion is not being read. Except for such read-write coordination, writing of data memory 111 is under control of request processor 101, which manages placement of data blocks in data memory 111 through its control messages to program library 102 via data link 105.

Figure 3:
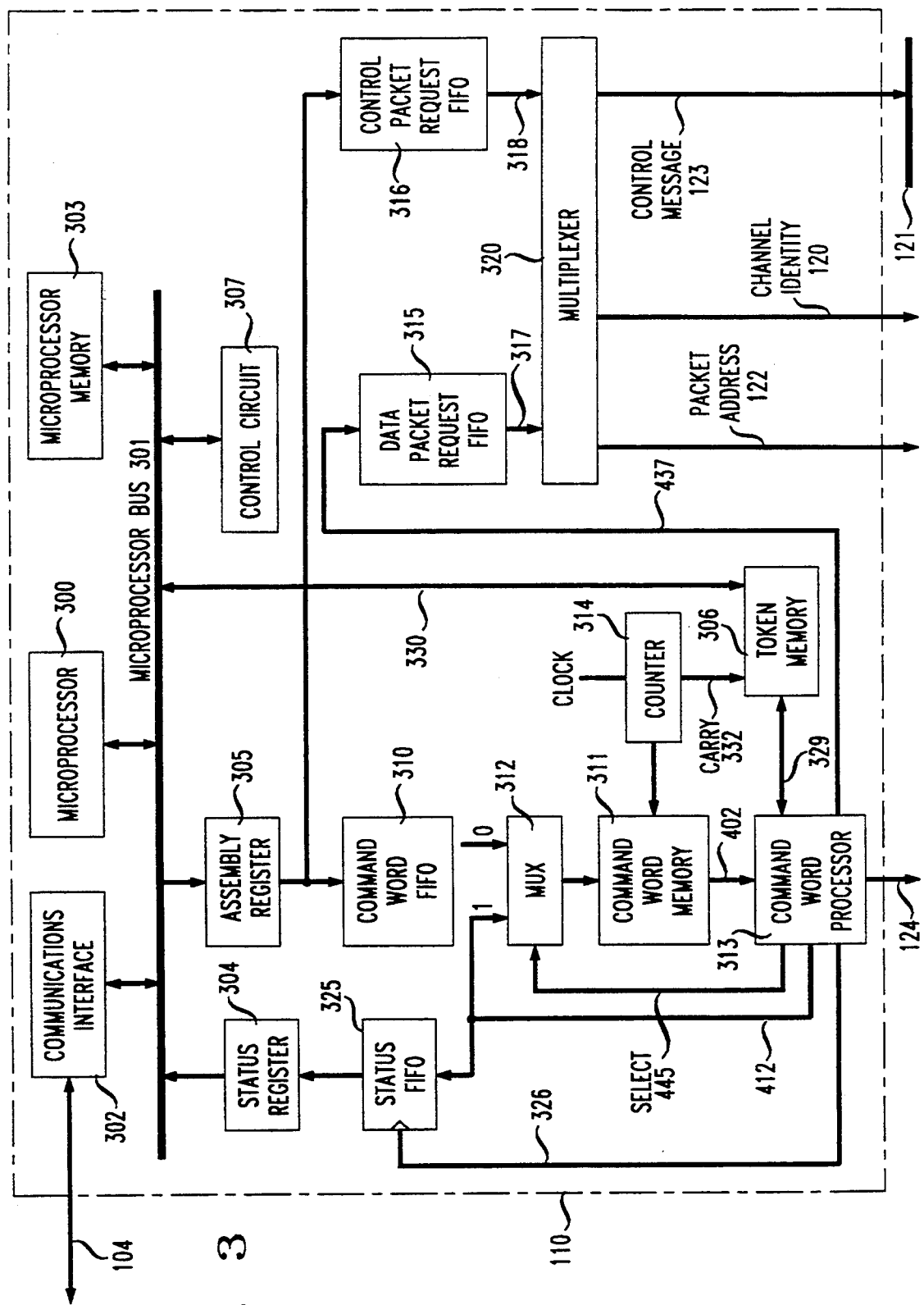
FIG. 3 is a block diagram of the controller in the server.

Controller 110 contains a microprocessor and various other elements to be explained in the description of FIG. 3. Each distribution board 112 contains a FIFO, a channel memory, a communications interface and other elements to be explained in the description of FIG. 7. In general terms, for each packet transmitted, controller 110 places a channel identity on channel-identity bus 120 and either 48 program bytes from data memory 111 or 48 control-message bytes from controller 110 on data bus 121. Each distribution board 112 can be set to transmit one or more selected channels. When a selected channel identity is present on channel identity bus 120, the distribution board writes such channel identity and the program or message data then appearing on data bus 121 into its FIFO. The communications interface transmits packets from the other end of the FIFO at the appropriate rate for the associated distribution link 115, for example, 155 megabits/second on a SONET OC-3 system.

Clock 113 generates various periodic timing signals for the elements of server 100. Only selected connections from clock 113 are indicated in the various figures, other connections not shown will be apparent to those skilled in the art.

Figure 2:
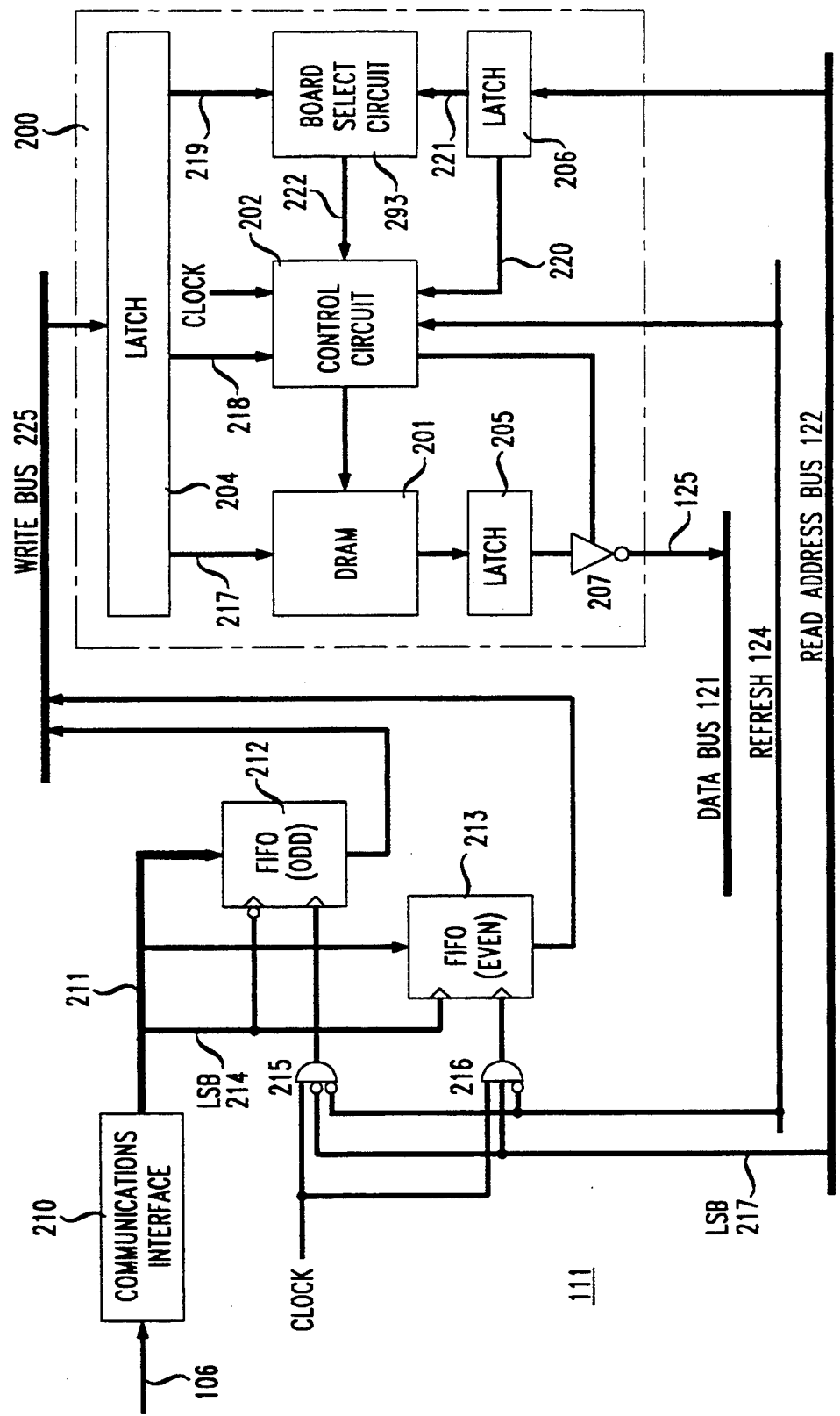
FIG. 2 is a block diagram of a RAM board and associated control circuitry in the data memory.

FIG. 2 is a block diagram of data memory 111, one of its component memory boards 200 and associated circuitry. In the exemplary embodiment, data memory 111 contains up to 64 memory boards 200 (only one such board is shown in FIG. 2) and each such board contains $2^{26}$ (over 64 million) 48-byte words of dynamic random access memory (DRAM) 201. Such DRAM can be assembled from, for example, Samsung Electronics KM41 C1600J CMOS DRAM chips, each chip holding 16 megabits. Each data memory board 200 also contains a control circuit 202, a board select circuit 203, latches 204, 205 and 206 and output drivers 207.

Communications interface 210 receives packets from program library 102 over data link 106 and converts each packet from serial to parallel form. In the exemplary embodiment, each packet contains 32 address bits and 48 data bytes for a total of 416 bits in parallel on bus 211. Incoming packets with odd addresses are stored in FIFO 212 and incoming packets with even addresses are stored in FIFO 213. Such storing is controlled by the least-significant bit brought out from bus 211 on lead 214. In the exemplary embodiment, FIFOs 212 and 213 each contain $2^{11}$ words. The outputs of FIFOs 212 and 213 are connected to memory boards 200 via write bus 225. In each memory board 200, latch 204 receives the write address and data from write bus 225, latch 205 holds data read from DRAM 201 and latch 206 holds the read address.

In the exemplary embodiment, each memory board 200 has an assigned 6-bit address. The data bits from latch 204 are connected to the "write" input of DRAM 201 via bus 217 and the write-address bits from latch 204 are connected to control circuit 202 (26 bits) and board select circuit 293 (6 bits) via buses 218 and 219, respectively. Similarly, the read-address bits from latch 206 are connected to control circuit 202 (26 bits) and board-select circuit 203 (6 bits) via buses 220 and 221, respectively. Board-select circuit 203 enables control circuit 202 via lead 222 when the 6 bits from the read address or write address correspond to the assigned address for the board.

During each memory cycle, a data word is read from memory 111 via data bus 121 and a data word can be written into memory 111 from either FIFO 212 or FIFO 213 via write bus 225 depending on the state of the least-significant bit of the read address on lead 217. AND gates 215 and 216 determine the FIFO from which the data word is to be obtained. Thus, read operations dominate so that when a data word is being read from an odd address, a data word can only be written into an even address and vice versa.

DRAMs 201 must be refreshed, periodically. Controller 110 enables lead 124 periodically for this purpose. The refresh signal on lead 124 also inhibits gates 215 and 216, thereby preventing words from being written during refresh cycles.

FIG. 3 is a block diagram of controller 110. Microprocessor 300 is connected through microprocessor bus 301 to communications interface 302, microprocessor memory 303, status register 304, assembly register 305, token memory 306 and control circuit 307. Communications interface 302 sends and receives control messages from request processor 101 (FIG. 1) for microprocessor 300 by means of a dedicated data link or a network such as the ETHERNET communications network. The program for operating microprocessor 101 is stored in microprocessor memory 303. Control circuit 307 generates various signals to operate the various circuits shown in FIG. 3 and receives status information about such circuits over connections not shown.

Control messages from request processor 101 over path 104 to controller 110 contain the information necessary for controller 110 to transmit the data block or blocks associated with each group. In response to a control message directing the transmission of a data block, microprocessor 300 creates a command word for such transmission in assembly register 305. In the exemplary embodiment, command words contain 108 bits. Command words are described in more detail below in the explanation of FIG. 4.

After creation, microprocessor 300 stores each new command word in command-word FIFO 310 by means of a signal from control circuit 307. FIFO 310 has a capacity of 256 command words in the exemplary embodiment. Command-word memory 311 contains command words for data blocks being sent during the current group and can also contain command words for data blocks to be sent during subsequent groups. In the exemplary embodiment, such memory has a capacity of $2^{13}$ command words. Command words are written into command-word memory 311 from FIFO 310 through multiplexer 312, as will be described.

Command-word processor 313 is a pipeline processor that reads command words sequentially from memory 311, processes such command words and writes processed command words back into memory 311 through multiplexer 312. Thus, command words from memory 311 are continually being circulated through processor 313. Command words are addressed by counter 314, which is incremented periodically by a signal from clock 113. In the exemplary embodiment, command words are processed at a rate of 50 million words per second. Thus, command-word processor 313 serves as a hardware accelerator to process command words at the high speed necessary to control the sending of packets by server 100.

Figure 5:
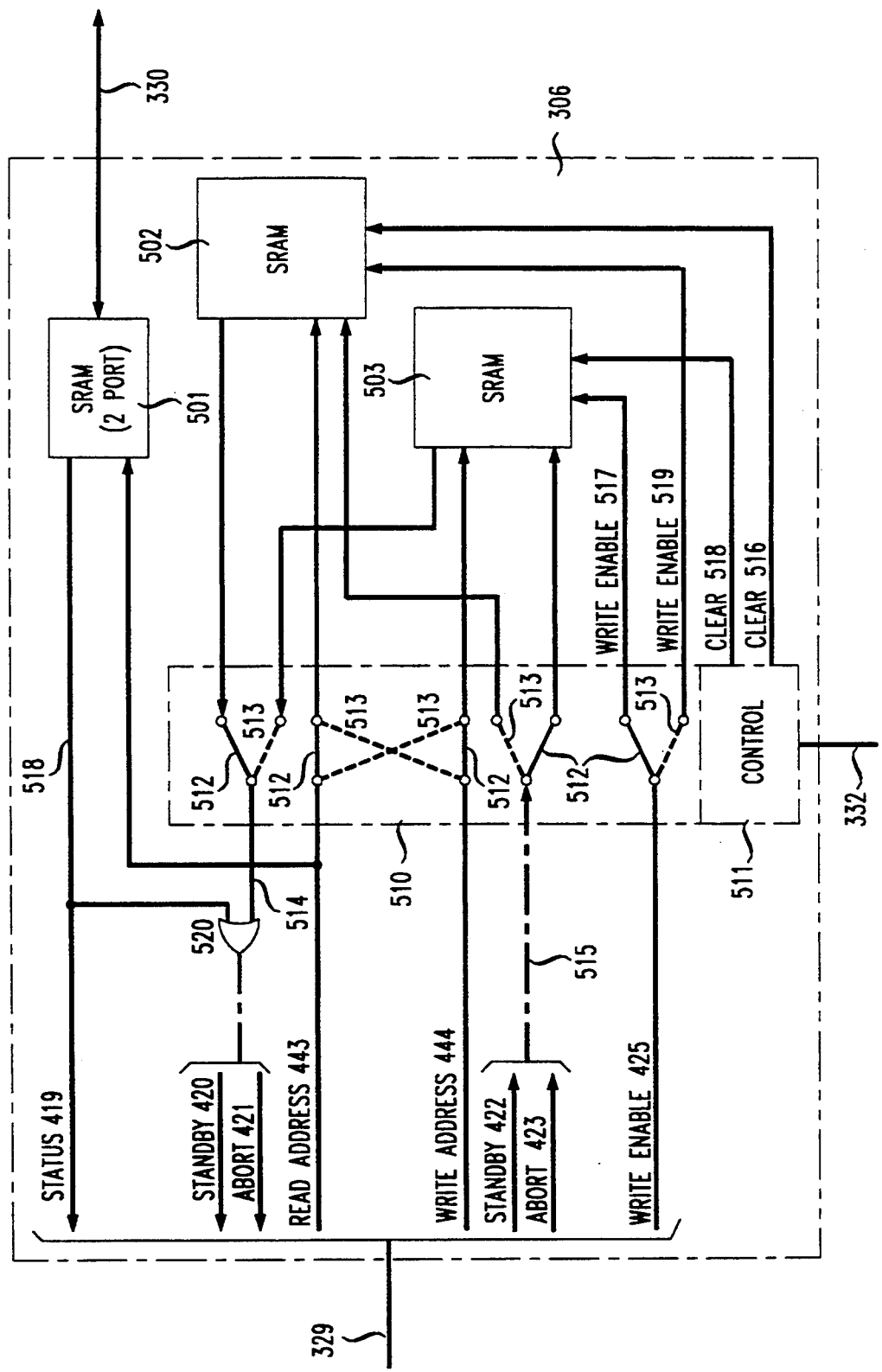
FIG. 5 is a block diagram of the token memory in the controller.

Token memory 306 contains three separate static random access memories (SRAMs) 501, 502 and 503, as shown in FIG. 5. Each SRAM stores token words containing control flags relating to each group. Two of SRAMs 502 and 503 are read and written alternately by command word processor 313 via bus 329, as will be explained below. The third SRAM 501 can be written and read directly by microprocessor 300 via microprocessor bus 301 and bus 330 and read by command-word processor 313, as will be described.

If the processing of a command word indicates that a data packet for the relevant data block is to be sent, processor 313 places a request for the packet in data packet request FIFO 315 via bus 437. Such request contains the address in memory 111 of such packet (32 bits) and the identity of the channel over which such packet is to be transmitted (12 bits).

Other control messages from request processor 101 can direct microprocessor 300 to send further control messages over distribution links 115. There may also be situations in which microprocessor 300 initiates control messages. Microprocessor 300 assembles such control messages in assembly register 305 and stores assembled control messages in control packet request FIFO 316 by means of control signals from control circuit 307.

Multiplexer 320 coordinates the sending of data packets and control packets over the various channels. In general, if data packet requests are present in FIFO 315, multiplexer 320 causes the data for each packet to be read from data memory 111 onto data bus 121 by placing the appropriate packet address on read address bus 122 and the channel identity for each packet on channel identity bus 120. If control packet requests are present in FIFO 316, multiplexer 320 places the control message on data bus 121 via bus 123 and again places the channel identity on channel identity bus 120. Multiplexer 320 will be described in more detail in the explanation of FIG. 6.

When certain changes occur in a command word during processing in command-word processor 313, the changed command word is stored in status FIFO 325 by means of a signal on lead 326. Microprocessor 300 senses the presence of command words in FIFO 325 via control circuit 307, reads them into status register 304 and then disassembles them onto microprocessor bus 301 for processing as appropriate. Microprocessor 300 can thus monitor the status of the various groups represented by command words in command-word memory 311. Certain status changes can cause microprocessor 300 to send status messages to request processor 101 via data link 104, as will be described.

Figure 4:
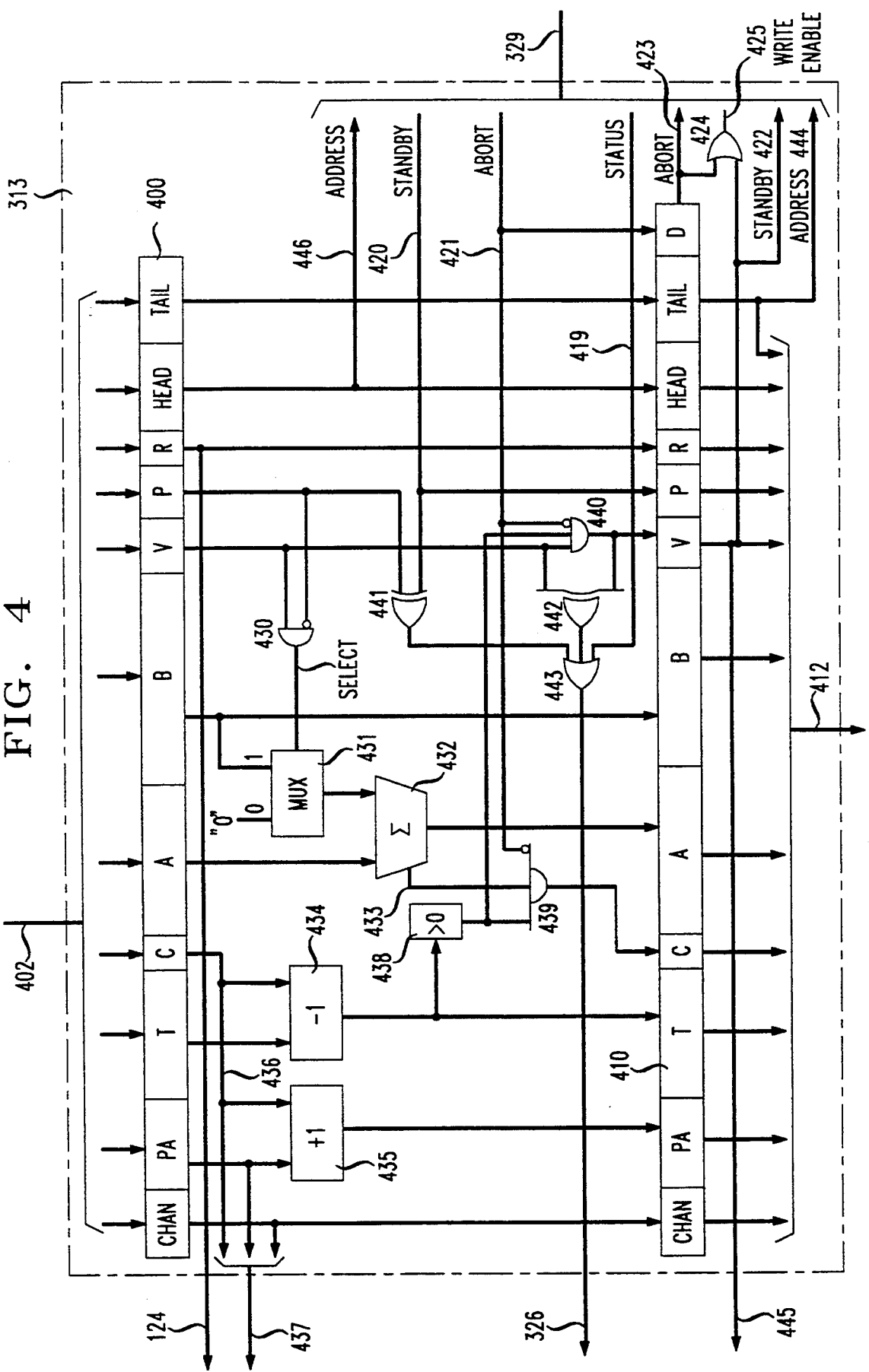
FIG. 4 is a block diagram of the command-word processor in the controller.

FIG. 4 is a block diagram of command-word processor 313, which operates on command words in a pipeline fashion. A command word read from command-word memory 311 via bus 402 is stored in register 400. A processed command word is stored in register 410. Command words are written back into command-word memory 311 from register 410 via bus 412 and multiplexer 312. For explanatory purposes, registers 400 and 410 are shown divided into the several fields and control flags making up a command word. As can be seen from FIG. 4, certain fields, namely CHAN, B, R, HEAD, and TAIL, are not changed as a command word passes through processor 313.

The CHAN field contains the number of the channel over which the data packets for a particular data block are to be transmitted. Each packet transmitted over distribution links 115 contains a channel number and 48 data or control bytes. Thus, in the exemplary embodiment of the invention, a "channel" is a virtual channel formed by a succession of packets having the same channel number. Channels can also be defined in other ways, such as the different channels in a conventional cable television distribution system.

The PA field contains the address of the next data packet to be sent for the data block. In a new command word, such address is that of the first packet. The T field contains a count of the number of packets still to be sent for the data block. The C flag indicates that a packet is to be sent the next time the command word is processed. The A field is an accumulator for timing the interval between packets in a data block. The B field contains an incremental value by which the A field is changed during each pass of the command word through processor 313, thus controlling the spacing between successive packets in a data block. The V flag indicates the validity status of the command word, that is, whether there are packets still to be sent for the data block it represents. The P flag holds a data block in a pause state during which no packets are sent. The R flag initiates a refresh of data memory 111. The HEAD field contains the identity of the group for which the data block is being sent. The TAIL field contains the identity of the next group of data blocks. The D flag, which is present only in output register 410, is used for aborting (removing) command words from command-word memory 311.

The processing of command words by processor 313 will now be described. The action of processor 313 on a command word is controlled by the V and P flags. One input of AND gate 430 is connected to the V flag in register 400 and the inverting input of AND gate 430 is connected to the P flag in register 400. Thus, for an command word having V set (indicating more packets) and P cleared (indicating that the associated data block is being sent), the output of gate 430 is enabled. The contents of the A field and the output of multiplexer 431 are added together in adder 432. When gate 430 is enabled, the output of multiplexer 431 is the value of the B field; when gate 430 is not enabled, the output of multiplexer 431 is zero. Thus, for a command word for a data block being sent, processor 313 increments the A field by the value of the B field.

As will be seen, a "carry" signal from adder 432 on lead 433 initiates the sending of a packet. When a command word is first written into FIFO 310 by microprocessor 300, the value of the B field is chosen in accordance with the desired nominal time interval between packets: the smaller the value of B, the longer the time interval. In the exemplary embodiment, about 4000 48-byte packets per second are needed for a 1.5 megabit/second audio/video channel, giving an interval between packets of about 250 microseconds. For a 256 kilobit/second stereo audio channel, about 667 packets/second are needed, giving an interval between packets of about 1.5 milliseconds.

When a command word is received in register 400 with the C flag set, subtractor 434 decrements the contents of the T field, adder 435 increments the contents of the PA field and a signal is sent to packet-request FIFO 315 via lead 436 in bus 437. Such signal causes the contents of the CHAN and PA fields to be loaded into FIFO 315, thus initiating the subsequent transmittal of the data packet located at the address identified in PA over the channel identified in CHAN.

If there are more packets to be sent for a data block, as indicated by a value greater than zero in the T field, the output of comparator 438 will be enabled. Accordingly, provided that the "abort" flag from token memory 306 is not set, gate 439 will be enabled and the C flag, when generated by adder 432, will be set in register 410. Thus, the next time the command word in register 410 is read from command-word memory 311, a signal will be sent to packet request FIFO 315 via lead 436 to initiate transmission of the next packet for the data block, as described above. After the last packet has been sent, the output of comparator 438 will be "0" and further carries on lead 433 will not set the C flag in register 410.

Gate 440 keeps the V flag set in a command word until the output of comparator 434 indicates that the last packet has been sent or the "abort" flag from token memory 306 is set. The P flag is set only if the "standby" flag read from token memory 306 is set. This is the case when at least one other valid command word contains the identity of the current group in its TAIL field.

Exclusive-OR gate 441 monitors the state of the P flag and exclusive-OR gate 442 monitors the state of the V flag. If the state of either flag in input register 400 differs from the state of such flag in output register 410, the output of the relevant exclusive OR gate is enabled and a signal is sent via OR gate 443 over lead 326 to status FIFO 325, thereby writing the command word in output register 410 into status FIFO 325. Thus, status FIFO 325 will contain command words reflecting changes in state of either the V flag or the P flag. As will be explained, a command word can also be entered into FIFO 325 by a token memory 306 by means of a signal on lead 419, which also connects to OR gate 443.

OR gate 443 can be arranged to have other inputs for triggering status indications, if desired. For example, to provide an indication that almost all packets in a data block have been sent, an additional comparator (not shown) having an output connected to OR gate 443 can be connected to compare the contents of the T field with a relatively low number, say 10. Then a status indication will be triggered when only 10 packets remain to be transmitted in a data block.

During the processing of each command word, processor 313 retrieves the "status," "standby" and "abort" flags from token memory 306 via leads 419, 420 and 421 and sets the "standby" and "abort" flags via leads 422 and 423 in accordance with the state of the V flag and the D flag, respectively. If either flag is set, OR gate 424 sends a "write enable" signal to token memory 306 via lead 425. Token flags are retrieved from the address, specified on read address bus 443, in token memory 306 corresponding to the group identity contained in the HEAD field and written to the address, specified on write address bus 444, in token memory 306 corresponding to the group identity contained in the TAIL field. As will be described, "standby" and "abort" flags are read from a part of token memory 306 that was written during the previous pass through the command words.

The R flag causes a "refresh" operation in data memory 111. Since data memory is a DRAM (dynamic random access memory) in the exemplary embodiment, such a refresh must be performed periodically, so special "refresh" command words for this purpose are stored in command-word memory 311. Such special command words typically contain nothing but a set R flag. In the exemplary embodiment, there are at least 16 such special command words in command-word memory 311. If the data memory is a kind that does not need to be refreshed, then the R flag and associated refresh circuits are not needed.

FIG. 5 is a block diagram of token memory 306. Such memory contains three separate SRAMs 501, 502 and 503. In the exemplary embodiment, each SRAM contains 211 token words; those in memory 501 each containing "status," "standby" and "abort" flags and those in memories 502 and 503 each containing "standby" and "abort" flags. The addresses in each of SRAMs 501, 502 and 503 correspond to the identities of groups. SRAM 501 is a two-port device capable of being written and read by microprocessor 300 via bus 330 and microprocessor bus 301 and read by command-word processor 313 via bus 329.

SRAMs 502 and 503 are written and read alternately during successive passes through the command-word descriptors by command-word processor 313. Two-state switch 510 controls such alternation. One state of switch 510 is indicated symbolically by solid lines 512; the other by dashed lines 513. In the first state, switch 510 connects output bus 514 and read address bus 443 to SRAM 502 and input bus 515, write address bus 444 and write enable lead 425 to SRAM 503; in the other state such connections are reversed.

Switch 510 is toggled by a "carry" signal from counter 314 over lead 332 to control 511. When such toggle action occurs, control 511 also sends a "clear" signal to the one of SRAMs 502 or 503 that is to be written next via lead 516 or lead 518, respectively. Thus, during odd-numbered passes through the command words, SRAM 502 is read and SRAM 503 is cleared and written by command-word processor 313 and during even-numbered passes SRAM 503 is read and SRAM 502 is cleared and written.

SRAM 501 is written by microprocessor 300 and serves to override SRAMs 502 and 503 and to request the status of command words for a group by means of the "status" flag. SRAM 501 is read by command-word processor 313 when either SRAM 502 or 503 is read and output bus 518 from SRAM 501 and output bus 514 from either SRAM 502 or SRAM 503 are combined in OR gate 520. Thus, microprocessor 300 can set the "status," "standby" and "abort" flags for the command words in a group directly.

When set, the "abort" flag aborts a group by clearing the V flag in each command word relating to the group. An abort is used, for example, in a situation where a group or sequence of groups for which a command word or words have been stored in FIFO 310 or memory 311 need not be completed. Setting the "abort" flag for the current group aborts all groups in the linked list formed by the entries in the HEAD and TAIL fields of the command words for successive groups. Referring back to FIG. 4, the "abort" flag is received on lead 421 from token memories 306 and inhibits AND gates 439 and 440, thus clearing both the C flag and the V flag in the outgoing command word. The received "abort" flag also sets the D flag in register 410, which causes the "abort" flag to be written back into token memory 306 at the address of the next group via lead 422. Thus, in successive cycles through the command words, the "abort" flag is propagated through all command words in the linked list.

When the V flag in a command word is cleared in register 410, such command word is not written back into memory 311. Multiplexer 312 is controlled by the V flag via lead 445 so that when the V flag is set, the command word from bus 412 is written into the address in memory 311 specified by counter 314 and when the V flag is cleared, a new command word from FIFO 310 is written into such address. Thus, the command word with a cleared V flag is replaced with a new command word.

When the "status" flag is set in a token word read from SRAM 501, a signal proceeds via lead 419, OR gate 443 (FIG. 4) and lead 326 to status FIFO 325, thereby storing the current command word in such FIFO. By setting the "status" flag for a particular data-block group, microprocessor 300 can thereby retrieve all command words for that group and determine the status of the fields in such command words. Examples of use of this feature will be described below.

Figure 6:
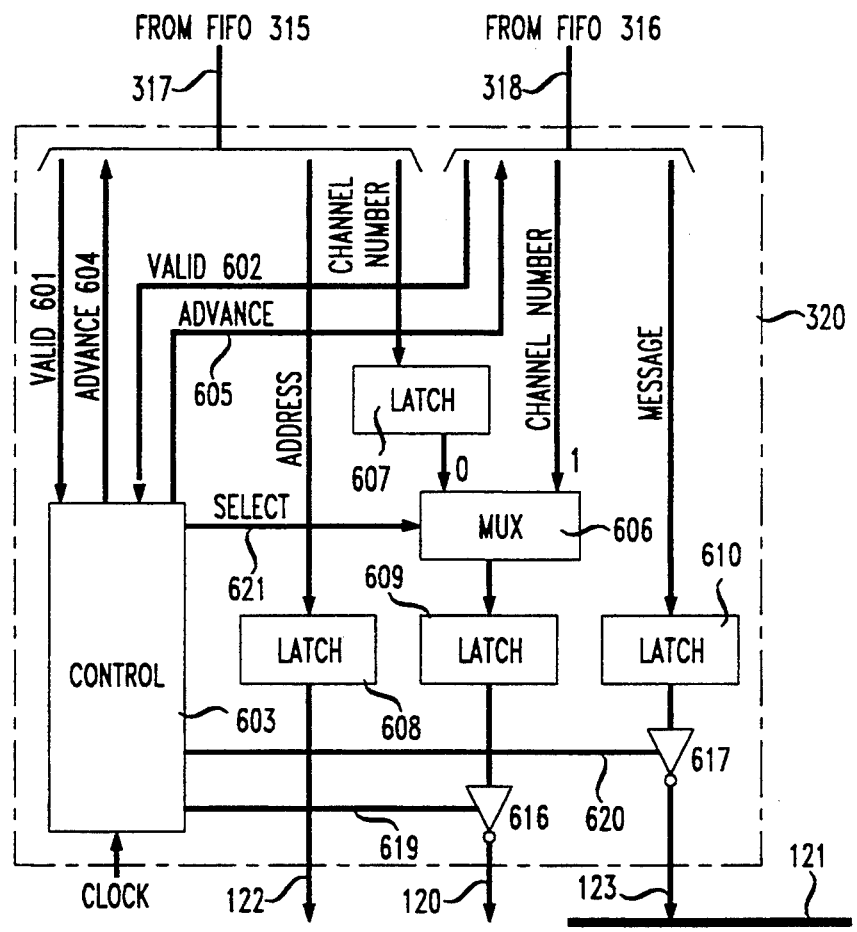
FIG. 6 is a block diagram of the multiplexer in the controller.

FIG. 6 is a block diagram of multiplexer 320, which controls the placement of data packets and control packets onto data bus 121 and channel identity bus 120. Multiplexer 320 receives requests to send data packets, each in the form of an address in data memory 111 and a channel number, from data packet request FIFO 315 via bus 317 and receives requests to send control packets, each in the form of a control message and a channel number, from control packet request FIFO 316 via bus 318. Data packets have priority over control packets, so if FIFO 315 contains any data packets, as indicated by a signal on lead 601, such packets will be sent before any control packets. The presence of control packet requests in FIFO 316 is indicated by a signal on lead 602.

Control 603 is a state machine that responds to the signals on leads 601 and 602 and clock signals with appropriately sequenced signals on leads 604 and 605 to advance FIFOs 315 and 316, respectively, a signal on lead 621 to set multiplexer 606 to receive from either latch 607 or FIFO 316 and signals on leads 619 and 620 to enable drivers 616 and 617, respectively. When a packet request is present in FIFO 315, as indicated by a signal on lead 601, control 603 responds with a signal on lead 604 to advance FIFO 315. The address field of the next packet request is then clocked into latch 608, placing the address of the desired data on read address bus 122, and the channel identity field is clocked into latch 607. At the next clock, multiplexer 606 is set to receive from latch 607 by an appropriate signal on lead 621 and the contents of latch 607 are transferred to latch 609. Meanwhile, the data for the packet is read into latch 205 on the appropriate memory board 200 in data memory 111. At the next clock, both driver 207 on such memory board and driver 616 in multiplexer 320 are enabled, thus simultaneously placing the data on data bus 121 via bus 125 and the channel identity on channel identity bus 120.

Figure 7:
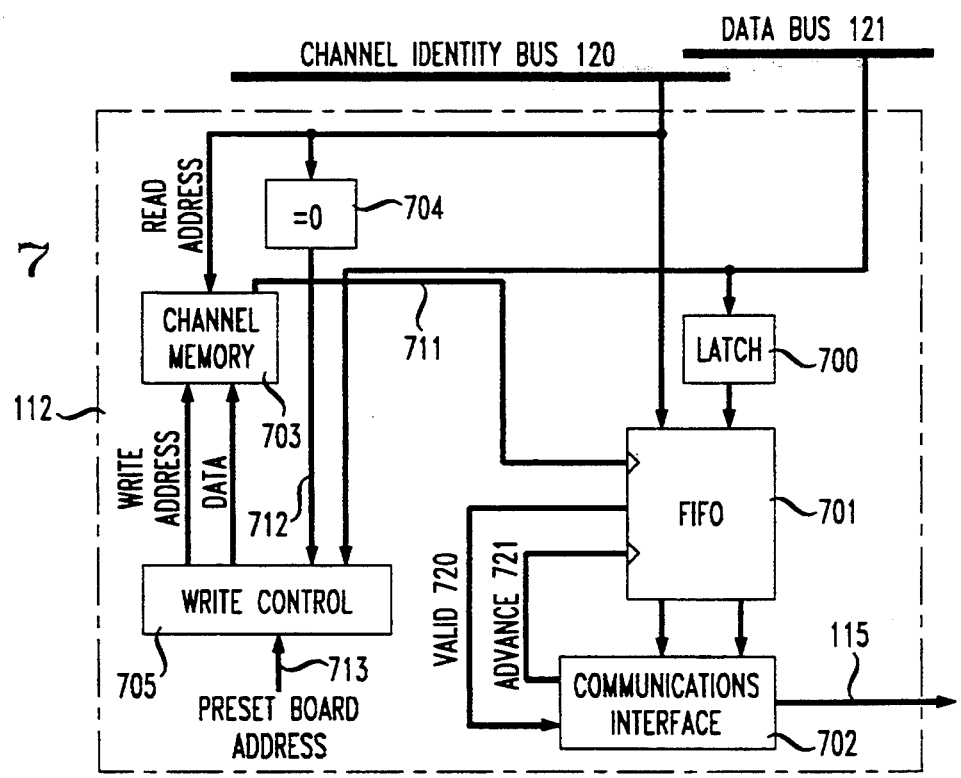
FIG. 7 is a block diagram of the distribution board used in the server.

FIG. 7 is a block diagram of a distribution board 112, which transmits packets for selected channels over distribution link 115. Distribution board 112 contains latch 700, FIFO 701, communications interface 702, channel memory 703, comparator 704 and write control 705. Channel memory 701 contains a flag for each possible channel ($2^{11}$ in the exemplary embodiment). A set flag for a given channel indicates that such channel is to be transmitted over distribution link 115 by the distribution board.

When a channel identity and its associated data appear on channel identity bus 120 and data bus 121, respectively, the channel identity on bus 710 is used as the read address for channel memory 703. If the flag for the addressed channel is set in channel memory 703, a signal on lead 711 writes the channel identity and data currently on buses 120 and 121 into FIFO 701. The data is delayed in latch 700 to allow time for channel memory 703 to be read.

If FIFO 701 contains packets to be transmitted, a signal on lead 720 causes communications interface 702 to advance FIFO 701 packet-by-packet by means of signals on lead 721, and to transmit such packets over distribution link 115. FIFO 701 acts as a buffer to absorb packets for transmission over distribution link 115 so that they can be transmitted at the rate appropriate for distribution link 115. Distribution link 115 can be, for example, an optical fiber data link carrying packets at a rate of 155 megabits per second.

The channels to be transmitted by distribution board 112 are identified by setting and clearing the flags for such channels in channel memory 703. This is accomplished by write control 705 in response to special control messages on data bus 121. Such control messages can be identified by a specific channel identity, for example channel "0," that is recognized by comparator 704. Such a control message will contain an address field identifying the distribution board 112 in which such a flag is to be changed, the address of the flag to be changed and an indication of whether the flag is to be set or cleared. When such a control message is received, write control 705 is enabled by a signal from comparator 704 on lead 712. Upon being enabled, write control 705 compares the board address in such address with a preset address for the board supplied on bus 713 and, if such addresses match, updates the addressed flag in channel memory 703 in accordance with such message.

Figure 8:
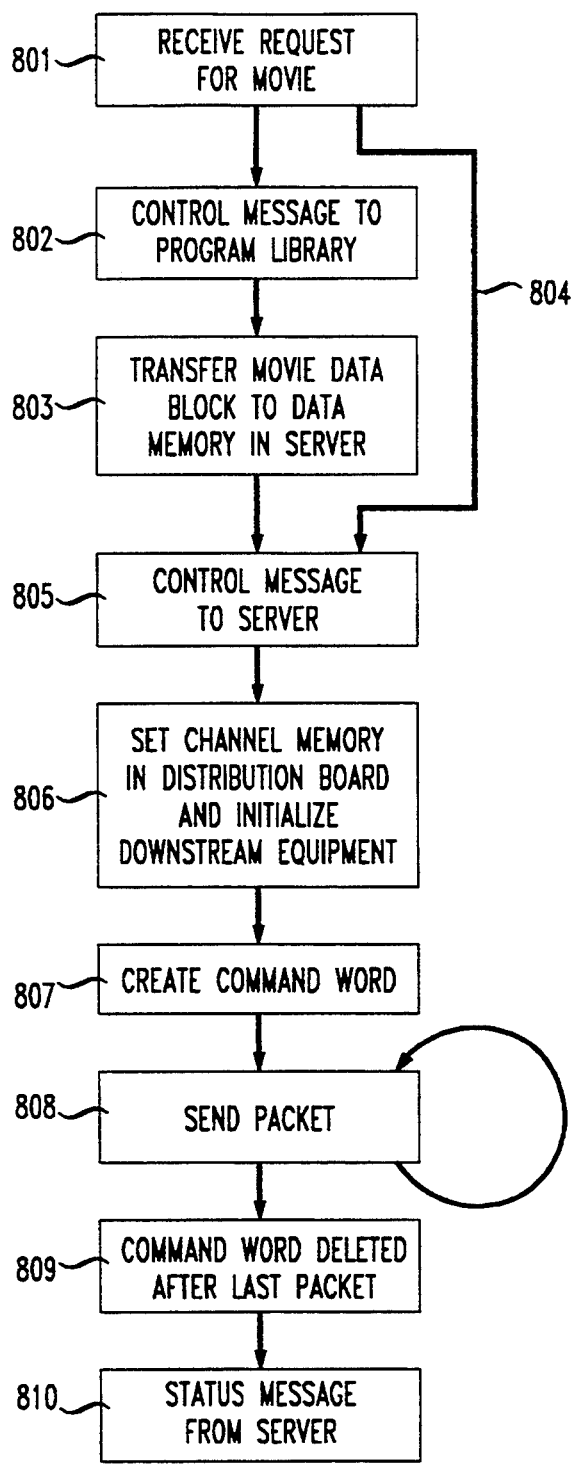

In order to illustrate the operation of the program server of the invention, a number of examples will now be described of various ways in which the server can be used. FIG. 8 is a flow chart showing the steps of an example in which a cable television system subscriber requests a specific movie. Such request is forwarded to request processor 101 (step 801), which then sends a first control message to program library 102 (step 802) to transfer the data block for the movie to a specific area in data memory 111 in server 100 (step 803). (As indicated by arrow 804, steps 802 and 803 can be skipped if such data block already resides in data memory 111 as a result of an earlier request.) Request processor 101 then sends a second control message to controller 110 to send the movie to the subscriber (step 805). Such second control message contains at least the identities of a specific distribution link 115 and channel over which the movie is to be transmitted, destination information for setting up the path to the subscriber, the address in data memory 111 of the first packet in the data block for the movie, the number of packets and information relating to the packet transmission rate for the B field of the command word. Microprocessor 300 responds to such second control message by creating a control message or messages in assembly register 305 to set channel memory 703 in the distribution board 112 associated with the specified distribution link 115 and to initialize downstream equipment and inserting such control message(s) in control-packet-request FIFO 316 for transmission (step 806); then creating a command word in assembly register 305 to govern the transmission of the data block for the movie and inserting such command word in FIFO 310 (step 807).

Regarding the control message sent by microprocessor 300 to channel memory 703, the channel-identity portion in such message is the identity recognized by comparator 704 in distribution boards 112, for example, "channel 0." The data portion of such control message contains the address of the distribution board 112 associated with the specified distribution link 115 and information to be written into channel memory 703 in such distribution board 112. Such information sets or clears flags in channel memory 703 indicating the channel or channels to be transmitted over such distribution link. In the first example, such information causes write control 706 to set the flag corresponding to the channel specified for the movie.

Regarding the command word, such word is created with the channel identity in the CHAN field, the address in data memory 111 of the first data packet of the movie in the PA field, the total number of packets in the movie in the T field, a cleared C flag, a cleared A field, a value in the B field relating to the timing of packets for an audio/video signal, a set V flag, cleared P and R flags, a cleared TAIL field and, in the HEAD field, a group identity for sending the data block. In this case, the group consists of the single audio/video data block for the movie. If a subsequent group, involving one or more data blocks, is to be sent after the movie is completed, the identity of such subsequent group is entered in the TAIL field. As will be described below, it is usually desirable to specify an identity for a subsequent group, even if it is not known that such identity will be needed when the command word is created.

As mentioned above, control messages can be sent from server 100 over data link 115 to initialize downstream equipment at the cable headend and/or the subscriber's location to receive the movie. Such control messages can be assembled in assembly register 305 and inserted in FIFO 316 for transmission via multiplexer 320 and the relevant distribution board 112. However, it may be desirable to send such control messages directly from request processor 101 over data link 103.

The command word proceeds through FIFO 310 into command-word memory 311. Command-word processor 313 periodically processes the command-word and inserts data packet requests in FIFO 315 when the value of the A field in the command word causes a carry in adder 432. Each packet request causes multiplexer 320 to retrieve the addressed data packet from data memory 111 and place such packet on data bus 121, together with the relevant channel identity on channel-identity bus 120. The appropriate distribution board 112 then sends the packet over its distribution link 115 (step 808). Packets continue to be sent in accordance with the command word until the last packet is sent, whereupon the V flag in the command word is cleared, thereby deleting the command word from command-word memory 311 (step 809) and permitting the sending of any subsequent group of data blocks identified in the TAIL field of the command word to begin. The change in the V flag causes the deleted command word to be entered into status FIFO 325 by exclusive-OR gate 442. On receiving the command word, microprocessor 300 can initiate a status message to request processor 101, indicating that sending of the movie has been completed (step 810).

Figure 9:
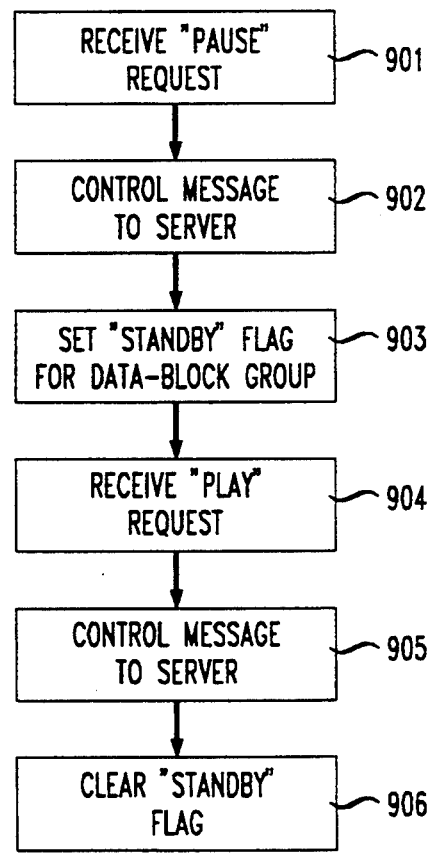

During the movie, the subscriber may request actions such as "play," "pause," "fast forward" and "fast reverse" by causing request messages for such actions to be sent to request processor 101. FIG. 9 is a flow chart showing the steps of an example in which a "pause" request is sent, followed by a "play" request. On receipt of the "pause" request (step 901), processor 101 sends a control message to server 100 (step 809) that causes microprocessor 300 to set the "standby" flag at the address in token memory 501 corresponding to the identity of the group including the data block for the movie (step 902). As a result, each time the command word is processed, the P flag in the command word will be set and no further packets will be sent. When a "play" request is received (step 904), a subsequent control message to server 100 (step 905) causes server 100 to clear such "standby" flag (step 905), whereby the sending of packets resumes.

"Fast forward" and "fast reverse" requests require the clearing of the PA and T fields in the command word to shift the address in data memory 111 where subsequent packets will be retrieved. This can be accomplished by creating a new command word with new values for PA and T in accordance with the extent of the shift requested. It can be seen that an arbitrarily large "jump" forward or backward can be made when an entire movie is stored in data memory 111 without the tape-winding delay required for such a jump when using a conventional video cassette machine. However, it is first necessary to determine the size of the jump.

FIG. 10 is a flow chart showing the steps involved in responding to a "fast forward" request. Such requests can be implemented, for example, by storing a scene list containing memory offsets in request processor 101, where each entry in the list indicates the relative address of the beginning of a scene with respect to the starting address of the movie. On receipt of a "fast-forward" request (step 1001), processor 101 sends a control message to server 200 requesting the status of the movie (step 1002). Microprocessor 300 sets the "status" flag in SRAM 501 in token memory 306 at the address corresponding to the group identity for the movie data block (step 1003), which causes the command word for such group to be entered into status FIFO 325. On receiving such command word, microprocessor 300 sends a status message to request processor 101 identifying the packet currently being sent according to the PA or T fields in the command word (step 1004). Request processor 101 then refers to the scene list to determine the address of the next scene (step 1005) and sends a control message to server 100 to send a short (e.g. 0.5 sec) clip from the movie starting at the beginning of the next scene (step 1006). Microprocessor 300 sets the "abort" flag in SRAM 501 in token memory 306 to delete the command word for the data block for the movie as presently being sent (block 1007) and then creates a new command word to send the clip (step 1008). Steps 1005, 1006 and 1008 are repeated as indicated by arrows 1009, 1010 and 1011, thereby traversing the scene list, until a "play" request is received (step 1012), whereupon processor 101 sends a control message to send the remainder of the movie beginning at the last-sent scene (step 1013). Each control message sent in steps 1006 and 1013 causes microprocessor 300 to create a new command word with the appropriate entries in the PA and T fields to send the clips (step 1006) or the remainder of the movie (step 1013) from the data block already resident in data memory 111. The viewer sees the succession of clips. Of course, the clips can be made any length necessary for comfortable scanning of the movie, and multiple "fast forward" instructions using clips of different lengths can be implemented if desired to give different scanning speeds. "Fast reverse" can be implemented in a similar manner by traversing the scene list in the opposite direction.

It can be seen from the above description that any number of requests (up to the capacity of the server) can be handled for simultaneous or overlapped independent transmissions of a given data block stored in data memory 111. A separate command word is generated for each such transmission which contains all the necessary information to control the transmission.

In another example, a request is received by request processor 101 from a subscriber customer for a movie with a soundtrack in a particular language. Assume that program library 102 includes a first set of files containing data blocks for movies having both the audio and video portions compressed and encoded together, with the audio portion being the soundtrack in the native language of the film, thereby having lip movements synchronized with the soundtrack, and a second set of files containing dam blocks for soundtracks in other languages and a separate video portion without sound. The dam block used in the first example described above is from the first set of files.

FIG. 11 is a flowchart of the steps involved in responding to a request for the movie in the specified language. Upon receipt of the request (step 1101), request processor 101 sends a control message to program library 102 to send two data blocks (step 1102), one for the separate video portion, the other for the soundtrack in the requested language, to data memory 111 in server 100 (step 1103). In addition, request processor sends a control message to server 100 that causes the necessary control messages to be sent to set the channel memory in the appropriate distribution board 112 for two channels and to initialize equipment downstream to receive both data blocks to generate the signal to the subscriber from the information in the data blocks (step 1104).

Microprocessor 300 then sets the "standby" flag in SRAM 501 of token memory 306 at the address corresponding to a group identity for the two data blocks (step 1105) and creates a separate command word for each data block (step 1106). Such command words have the same group identity in at least their HEAD fields, thus associating the two data blocks as a group. However, since the packets in the audio data block will be fewer in number than the packets in the video data block and the data blocks will be sent over distribution link 115 in different channels and at different intervals, the values in the CHAN, PA, T and B fields will differ in the two command words. The P flag is cleared in each command word initially.

When each command word reaches command-word memory 311 and is processed by command-word processor 311, the fact that the "standby" flag for the relevant group is set in token memory 306 will cause the P flag in each command word to become set, thus inhibiting sending of packets. The change in the P flag during the first processing iteration for each command word causes such command word to be entered into status FIFO 325 by the action of exclusive-OR gate 441, thus giving microprocessor 300 an indication that the command word is in command-word memory 311 and is being processed (step 1107). When both command words are in memory 311, microprocessor 300 clears the "standby" flag in token memory 306 (step 1108), thus permitting packets from both data blocks to be transmitted under control of their respective command words (step 1109). It will be clear that the sending of two or more data blocks can be coordinated and synchronized by this technique. After the last packet in each data block is sent, causing the V flag in the associated command word to be cleared, the command word is deleted from command word memory 310 and inserted in status FIFO 325 by the action of exclusive-OR gate 442 (step 1110). Upon receipt of such command words from status FIFO 325, microprocessor 300 can send status messages to request processor 101.

In step 1109, both command words cause the packets from their associated data blocks to be sent over the relevant channels at the appropriate intervals. Because the group identity in the HEAD field is the same in both command words, any "standby" or "abort" flag set in token memory 306 will affect both command words. Also, the response to a request such as "fast-forward" will require replacement of both command words and the "clips" described above will need both audio and video components. Thus, the scene list will have entries for both the audio and video packets at the beginning of a scene. Such packets can be chosen so that the audio and video are in synchronism at the beginning of a scene.

It will be clear from the above description that an audio-visual work can be transmitted from combined audio/video data blocks as in the first example or separate audio and video data blocks as in the second example. In applications in which it is desirable to always store the video in combination with audio and transmit the combination on a single channel, such as movies in their "native" language, then a request for movies in different languages can be handled by transmitting the combined version in one channel and the different-language soundtrack in another channel and sending control messages to a convenient point downstream, such as at the cable headend, to cause the different-language soundtrack to be substituted for the native-language soundtrack before the movie is finally presented to the viewer.

As a further example, consider an interactive video application in which a sequence of audio/video clips is to be sent over a distribution link 115, with successive clips being selected by request processor 101 in accordance with responses from the viewer to preceding clips, for example, as in a video teaching system. Each such audio/video clip will be sent in the same manner as the movie described in the first example, with the associated control messages and command word necessary for such sending. However, the TAIL field in the command word for each video clip will contain the group identity contained in the HEAD field of the succeeding video clip. Thus, the "standby" flag at an address in token memory 306 will be set via lead 422 whenever a command word having such address in its TAIL field is processed by command-word processor 313, and when a command word having such address in its HEAD field is processed, the P flag in such command word will be set, thereby preventing the sending of packets in the data block associated with such command word until all command words having such address in their TAIL fields are removed from command-word memory 311.

At the time of creating a command word, it is desirable to assign the identity of the data-block group to follow so that such identity can be inserted in the TAIL field of the command word being created. Such identity can than be saved, for example, in microprocessor memory 303, in readiness for the creation of command words for the next data-block group. Such technique can be conveniently used whenever a string of clips is sent, as in the example just described or the "fast forward" or "fast reverse" operations described earlier.

The audio/video clips in the last example can be made up of multiple audio and/or video clips to be transmitted simultaneously over different channels as part of the same group and combined at some point downstream from distribution board 115. Some overlays in a group may have a longer time duration than others. However, each overlay in such a group will have its own command word, and all the command words for the overlays in a group will typically have the same group identities in the HEAD and TAIL fields. Accordingly, when such command words are processed in processor 313, the TAIL field of each command word will cause the "standby" flag for the subsequent group to be set repeatedly in token memory 306 until the last packet of the longest overlay is sent.

Many other applications useful in interactive television systems can be implemented using server 100. Another application relating to movies is the ability to show an abridged version of a movie. In such an application, scene lists for abridged versions are stored in request processor 102. When a request for an abridged version is received, processor 102 causes the data block(s) for the complete movie to be sent to data memory 111 from program library 102 and control messages for the scenes (or sequences of scenes) making up the abridged version to be sent to server 100. Server 100 then sends only the abridged version to the viewer requesting it. Of course, the complete movie can be transmitted to other viewers at the same time using additional command words for each such transmission.

It is expected that in a movie application as described above that data memory 111 will act essentially as a cache memory and that the most popular movies at any given time will probably be constantly stored in such memory during periods of high activity. Thus, transmissions from program library 102 to server 100 will be relatively infrequent for the data blocks for such movies. However, it will be clear that the operation of server 100 is completely flexible and that one-of-a-kind and tailored transmissions can be handled as readily as transmissions of the same material to multiple users.

Other possible applications that can be easily implemented by use of server 100 and the principles of the invention are those of the kind described in application Ser. No. 07/965,493 in which audio and/or video programs or program segments are distributed to one or more subscribers, with the given program for a particular cable subscriber being defined by the channels that are enabled for such subscriber.

Still other applications are possible in which the subscriber can interact with the material being transmitted. For example, a subscriber can request a movie in a particular language and switch to another language during the showing. The initial request is implemented by means of the steps shown in FIG. 11. A request to change languages causes request processor 101 to obtain the status of the movie from server 100, transmit a data block comprising at least the remainder of the soundtrack of the movie in the new language to data memory 111 in server 100 and then cause microprocessor 300 to create a new command word for the new soundtrack data block and abort the soundtrack for the old soundtrack data block. A similar application could be implemented regarding multiple versions of the same movie with different ratings in which the viewer may wish to switch back and forth between ratings depending on the audience. In such an application, certain scenes that might be included in one version could be skipped in another version, but without any time lapse being apparent at the point of the skipped scene. A similar application could be adapted to show motion pictures with subtitles in different languages. In this application, upon receipt of a request for a motion picture with subtitles in a specified language, three data blocks would be retrieved and stored. The first data block would represent the video track of the motion picture. The second data block would represent the audio track of the motion picture. The third data block would represent the subtitles in the requested language.

The invention has been shown and described with reference to particular embodiments. However, it will be understood by those skilled in the art that various changes may be made therein without departing from the spirit and scope of the invention.

What is claimed is:

1. A server for sending one or more data blocks from a data memory in specified channels over a distribution system at controlled time intervals, which comprises:
a command-word memory for storing a command word for each said data block to be sent, each command word including at least the identity of the channel for said data block, the address in said data memory of the next portion of said data block to be sent and a time indication;
first processing means for receiving requests to send data blocks and for storing said command words in said command memory in response to said requests;
second processing means for periodically processing each command word in said command-word memory, said second processing means comprising:
means for updating the time indication in said command word;

means operative when said time indication reaches a threshold value for retrieving the portion of said data block from the address in said data memory specified in said command word and updating said address; and means for sending said retrieved portion in said identified channel over said distribution system.

2. The server of claim 1 wherein each said command word includes an incremental value related to the time desired between the sending of successive portions of its associated data block and said means for updating said time indication further comprises:

means for incrementing said time indication by the amount of said incremental value.

3. The server of claim 1 wherein each said command word includes a quantity representing the number of portions of its associated data block still to be transmitted and at least one command flag, a first one of said command flags being asserted when all portions of the associated data block have not been sent, and said second processing means further comprises:

means for modifying said quantity when each said portion is sent;

means responsive to said quantity for negating said first command flag when all portions of the associated data block have been sent; and means, responsive to said first command flag for substituting a new command word from said first processing means for a command word processed by said second processing means when said first command flag is not asserted.

4. The server of claim 3 wherein each command word also includes a first identity specifying a first group of one or more data blocks to which its associated data block belongs, a second identity specifying a second group of one or more data blocks and wherein a second one of said command flags is asserted to indicate an abort state, which further comprises:

first and second token memories for storing token words at addresses corresponding to said identities, each said token word including at least one token flag, and wherein said second processing means further comprises:

means operative during odd passes through said command words for clearing said first token memory and, for each command word, reading a token word from the address in said second token memory corresponding to said first identity and, when either the first command flag or the second command flag is asserted in the processed command word, storing a token word at the address in said first token memory corresponding to said second identity;

means operative during even passes through said command words for clearing said second token memory and, for each command word, reading a token word from the address in said first token memory corresponding to said first identity and, when either the first command flag or the second command flag in the processed command word is set, storing a token word at the address in said second token memory corresponding to said second identity;

the states of said first and second token flags in said stored token words corresponding, respectively, to the states of said first and second command flags in said processed command word.

5. The server of claim 4 wherein a third one of said command flags is asserted to indicate a pause state and said second processing means further comprises:

means for asserting said third command flag in the command word being processed when the first token flag in the token word retrieved for said command word is asserted; and means for inhibiting the sending of portions of the data block associated with a command word when the third command flag in said command word is asserted.

6. The server of claim 5 which further comprises:

a third token memory for storing token words at addresses corresponding to said identities, each said token word in said third token memory including said first and second token flags and a third token flag;

means connected to said first processing means for writing token words into said third token memory and wherein said second processing means further comprises:

means operable during the reading of a token word from an address in either said first token memory or said second token memory for reading the token word from the same address in said third token memory and creating a combined token word wherein the first and second token flags correspond to the logical-OR of such flags in both token words read and wherein said third token flag corresponds to the third token flag from said third token memory.

7. The server of claim 6 wherein said second processing means further comprises:

means operable during the processing of a command word for negating the first command flag and asserting the second command flag in said command word when the second token flag is asserted in the token word retrieved for said command word.

8. The server of claim 6 wherein said second processing means further comprises:

means operable after the processing of a command word for sending said command word to said first processing means when the third token flag is set in the token word retrieved for said command word.

9. The server of claim 1 wherein said first processing means also receives requests to send control messages over identified channels and wherein said second processing means further comprises:

first buffer means connected to said second processing means for storing the addresses of said data-block portions to be sent and the channel identities for said portions;

second buffer means connected to said first processing means for storing control messages to be sent and the channel identities for said control messages, and wherein said means for retrieving and means for sending further comprise:

multiplexing means connected to said first and second buffer means for retrieving said addresses and associated channel identities in sequence from said first buffer means and, for each said address, reading said portion from said address in said data memory and sending said retrieved portion in said identified channel over said distribution system and, when said first buffer means is empty, retrieving each said control message and associated channel identity in sequence from said second buffer means and sending said control message in said identified channel.

10. The server of claim 1 or claim 9 in which each retrieved data-block portion and its associated channel identity and each control message and its associated channel identity are sent over said distribution system as digital packets and wherein said server is adapted for sending digital packets over one or more distribution links, which further comprises:
   a channel memory associated with each distribution link for indicating particular channels to be sent over said distribution link and wherein said means for sending further comprises:
      means for sending a digital packet over said distribution link when the channel identity in said digital packet corresponds to a channel indicated in said channel memory.

11. The server of claim 10 in which control messages are sent over at least one dedicated channel, certain control messages specify channels to be sent on each distribution link and wherein each channel memory further comprises:
   means responsive to said certain control messages for storing in said channel memory the identities of the channels to be sent on the distribution link associated with said channel memory.

12. The server of claim 10 in which each distribution link further comprises:
   means for buffering the data items to be sent over the distribution link and sending such data items over said distribution link at the appropriate transmission speed for said distribution link.

13. The server of claim 1 in which said data memory is a dynamic random access memory, each said command word contains a fourth command flag, said command-word memory contains at least one command word having said fourth command flag asserted and said second processing means further comprises:
   means responsive to said fourth command flag in said command words for refreshing said data memory when said fourth command flag is asserted.

14. The server of claim 1 which further comprises:
   means for writing said data blocks into said data memory from an external source.

15. The server of claim 14 in which said data memory is divided into at least two segments, said second processing means reads from one segment of data memory at a time and said means for writing further comprises:
   means for inhibiting writing into a segment of data memory when said second processing means is reading from the same segment.

16. The server of claim 14 in which said data memory is a dynamic random access memory, said second processing means periodically refreshes said data memory and said means for writing further comprises:
   means for inhibiting writing into said data memory when said second processing means is refreshing said data memory.

17. The server of claim 14 in which said means for writing further comprises:
   means for receiving said data blocks from said external source as a series of packets, each said packet containing one of said portions of said data block and the address in said data memory at which said portion is to be written.

18. A method of sending portions of one or more data blocks from a data memory in specified channels over a distribution system at controlled time intervals, which further comprises:
   creating and storing a command word for each said data block to be sent, each command word including at least the identity of the channel for said data block, the address in said data memory of the next portion to be sent and a time indication;
   periodically processing each stored command word, including the steps of:
      updating the time indication;
      when said time indication reaches a threshold value, retrieving the portion of said data block from the address in said data memory specified in said command word and updating said address; and
      sending said retrieved portion in said identified channel over said distribution system.

19. The method of claim 18 wherein each command word includes an incremental value related to the time desired between the sending of successive portions of its associated data block and said step of updating the time indication comprises:
   incrementing said time indication by the amount of said incremental value.

20. The method of claim 19 wherein each said command word includes a quantity representing the number of portions of its associated data block still to be transmitted and at least one command flag, a first one of said command flags being asserted when all portions of the associated data block have not been sent, which further comprises:
   modifying said quantity when each said portion is sent;
   negating said first command flag when all portions of the associated data block have been sent; and
   substituting a new command word for a processed command word when said first command flag is not asserted in said processed command word.

21. The method of claim 20 wherein each command word includes a first identity specifying a first group of one or more data blocks to which its associated data block belongs, a second identity specifying a second group of one or more data blocks and a second one of said command flags is asserted to indicate an abort state, which further comprises:
   during odd passes through said command words, clearing a first token memory and, for each command word, retrieving a token word from an address in a second token memory corresponding to said first identity and, when either the first command flag or the second command flag is asserted in the processed command word, storing a token word at the address in said first token memory corresponding to said second identity; and
   during even passes through said command words, clearing said second token memory and, for each command word, retrieving a token word from an address in said first token memory corresponding to said first identity and, when either the first command flag or the second command flag is asserted in the processed command word, storing a token word at the address in said second token memory corresponding to said second identity;
   the states of first and second token flags in a token word stored for a command word corresponding, respectively, to the states of said first and second command flags in said command word.

22. The method of claim 21 wherein a third one of said command flags is asserted to indicate a pause state, which further comprises:

asserting said third command flag in the command word being processed when the first token flag in the token word retrieved for said command word is asserted; and inhibiting the sending of portions of the data block associated with a command word when the third command flag in said command word is asserted.

23. The method of claim 22 which further comprises:

storing token words in a third token memory at addresses corresponding to said identifies, each said token word in said third token memory including said first and second token flags and a third token flag;

during the reading of a token word from an address in either said first token memory or said second token memory, reading the token word from the same address in said third token memory and creating a combined token word wherein the first and second token flags correspond the logical-OR of such flags in both token words read and wherein said third token flag corresponds to the third token flag from said third token memory.

24. The method of claim 23 which further comprises:

during the processing of a command word, negating the first command flag and asserting the second command flag in said command word when the second token flag is asserted in the token word read for said command word.

25. The method of claim 24 in which control messages are sent in addition to said portions of data blocks, which further comprises:

storing the addresses of data-block portions to be read from said data memory, together with the channel identities for such portions, in a first buffer;

storing said control messages, together with the channel identities for such control messages, in a second buffer;

retrieving said addresses and associated channel identities in sequence from said first buffer and, for each said address, reading said data block portion from said address in said dam memory and sending said retrieved portion in said identified channel over said distribution system; and when said first buffer means is empty, retrieving each said control message and associated channel identity in sequence from said second buffer and sending said control message in said identified channel.

26. The method of claim 18 or claim 25 wherein each retrieved data-block portion and its associated channel identity and each control message and its associated channel identity are sent over said distribution system as digital packets and wherein said digital packets are sent over one or more distribution links, which further comprises:

indicating particular channels to be sent over a distribution link in a channel memory associated with said distribution link; and sending a digital packet over each distribution link when the channel identity in said digital packet corresponds to a channel indicated in said channel memory.

27. The method of claim 18 which further comprises:

writing said data blocks into said data memory from an external source.

28. The method of claim 27 wherein said data memory is divided into at least two segments, which further comprises:

inhibiting writing into a segment of said data memory when said second processing means is reading from the same segment.

29. A method of sending one or more data blocks from a storage library at controlled rates to one or more users over specified channels in a distribution system, which comprises:

upon receipt of a request for a data block:

retrieving said data block from said storage library and storing said data block in a random-access memory;

creating and storing a command word for each such request, each said command word containing at least the identity of the channel for said data block, the address in said data memory of the next portion to be sent and a time indication;

periodically processing each stored command word, including the steps of:

updating the time indication;

when said time indication reaches a threshold value, retrieving the portion of said data block from the address in said random-access memory specified in said command word and updating said address; and sending said retrieved portion in said identified channel over said distribution system.

30. The method of claim 29 wherein said data blocks represent programs such as audio or audio-visual works and said method is adapted to receive "pause" and "play" requests, which further comprises:

on receipt of a "pause" request for a program, asserting a pause flag in the command word for said program;

on receipt of a "play" request for a program, negating said pause flag; and wherein said processing step further comprises:

when said pause flag is asserted, inhibiting the sending of data-block portions for said program.

31. The method of claim 30 adapted for sending sequences of programs and wherein each said command word also contains a first identity for the program associated with said command word and a second identity for the next program to be sent, which further comprises:

assigning a token flag to each possible identity; and wherein said processing step further comprises:

asserting said token flag assigned to said second identity in the command word being processed; and if the token flag assigned to said first identity in said command word was asserted during the previous periodic processing of said command words, asserting the pause flag in said command word to place the program associated with said command word in the pause state;

whereby all programs in said sequence except the first are maintained in the pause state.

32. The method of claim 31 adapted to receive "fast forward" requests wherein each said command word also contains a quantity representing an amount of the program to be played, which further comprises:

storing a list of subprogram addresses, each said subprogram address identifying the start of a subprogram within the current program;

on receipt of a "fast forward" request for said current program:
retrieving the present address for said current program from its command word;
determining the subprogram following said present address from said list;
creating and storing a new command word to play a portion of said next subprogram, beginning at the address stored for said subprogram, said new command word having as its first identity the second identity from the command word for the current program;
deleting the command word for the current program;
repeating said step of creating and storing a new command word for each subprogram in sequence, each said new command word having as its first identity the second identity for the previous command word; and
upon receipt of a "play" request for said current program;
creating and storing a new command word to play the remainder of said current program, beginning at the address stored in said list for the next subprogram, said new command word having as its first identity the second identity for the previous command word.

33. The method of claim 31 adapted to receive "fast reverse" requests wherein each said command word also contains a quantity representing the amount of a program to be played, which further comprises:
storing a list of subprogram addresses, each said subprogram address identifying the start of a subprogram within the current program;
on receipt of a "fast reverse" request for said current program:
retrieving the present address for said current program from its command word;
determining the address of the subprogram preceding said present address from said list;
creating and storing a new command word to play a portion of said preceding subprogram, beginning at the address stored for said subprogram in said list, said new command word having as its first identity the second identity from the command word for the current program;
deleting the command word for the current program;
repeating said step of creating and storing a new command word for each subprogram in reverse sequence, each said new command word having as its first identity the second identity for the previous command word; and
upon receipt of a "play" request for said current program;
creating and storing a new command word to play the remainder of said current program, beginning at the address of the preceding subprogram, said new command word having as its first identity the second identity for the previous command word.

34. The method of claim 31 wherein said program is an audio/visual work comprising one or more audio and one or more video tracks to be played simultaneously, each said command word also contains an incremental value relating to the time desired between the sending of successive portions of its associated data block and said creating and storing step further comprises:
creating and storing a command word for each audio track and each video track, the first and second identities being the same in all said command words, said channel identities and said addresses in said data memory being different in each said command word and said incremental values in said command words being selected appropriately for each respective track.

35. The method of claim 34 wherein each program in a sequence comprises a group of one or more audio and/or video tracks to be played simultaneously, wherein said creating and storing step further comprises:
creating and storing the command words for all the audio and/or video tracks in each group with the same first and second identities.

36. The method of claim 34 adapted to show motion pictures in different languages in accordance with received requests, wherein said retrieving and storing step further comprises:
upon receipt of a request for a motion picture in a specified language, retrieving and storing a first data block for the video track of said motion picture and a second data block for the audio track of said motion picture in said specified language.

37. The method of claim 34 adapted to show motion pictures with subtitles in different languages in accordance with received requests, wherein said retrieving and storing step further comprises:
upon receipt of a request for a motion picture with subtitles in a specified language, retrieving and storing a first data block for the video track of said motion picture, a second dam block for the audio track of said motion picture and a third data block for the subtitles in the requested language.

38. The method of claim 31 adapted to show an abridged version of a program, which further comprises:
creating a list of scene addresses for the scenes in said abridged version, each scene address identifying the start of a scene in said program; wherein said retrieving and storing step further comprises:
upon receipt of a request for said abridged version:
retrieving the data block for said program from said storage library and storing said data block in said random-access memory; and wherein said creating and storing step further comprises:
sequentially creating and storing command words for each scene in said list of scene addresses.

39. The method of claim 29 adapted to change programs in accordance with a received request, which further comprises:
upon receipt of a request to change programs from a first version currently being sent to a second version:
retrieving the present address for said first version from the command word for the data block for said first version;
retrieving from said program library and storing in said data memory at least the portion of the data block for the second version corresponding to the remainder of the program;
creating and storing a new command word for the remainder of said second version and
deleting the command word for said first version.

40. The method of claim 39 in which said first version is a motion picture soundtrack in a first language and said second version is the soundtrack for said motion picture in a second language.

41. The method of claim 39 in which said first version is a motion picture having a first rating and said second version is said motion picture having a second rating.

* * * * *